(12) United States Patent
Bartolotta

(10) Patent No.: US 11,370,368 B2
(45) Date of Patent: Jun. 28, 2022

(54) SEWAGE HOSE RINSING APPARATUS

(71) Applicant: Vito Ignatius Bartolotta, Sisters, OR (US)

(72) Inventor: Vito Ignatius Bartolotta, Sisters, OR (US)

(*) Notice: Subject to any disclaimer, the term of this patent is extended or adjusted under 35 U.S.C. 154(b) by 0 days.

(21) Appl. No.: 17/188,968

(22) Filed: Mar. 1, 2021

(65) Prior Publication Data

US 2022/0063521 A1   Mar. 3, 2022

Related U.S. Application Data

(60) Provisional application No. 63/039,768, filed on Aug. 25, 2020.

(51) Int. Cl.
| | | |
|---|---|---|
| *B60R 15/04* | (2006.01) | |
| *B08B 9/032* | (2006.01) | |
| *E03F 9/00* | (2006.01) | |
| *F16L 3/00* | (2006.01) | |

(52) U.S. Cl.
CPC .............. *B60R 15/04* (2013.01); *B08B 9/032* (2013.01); *E03F 9/00* (2013.01); *F16L 3/003* (2013.01)

(58) Field of Classification Search
CPC .. B60R 15/04; F16L 3/003; E03F 9/00; B08B 9/032
USPC .................................... 248/75, 110, 111, 113
See application file for complete search history.

(56) References Cited

U.S. PATENT DOCUMENTS

| | | | | |
|---|---|---|---|---|
| 1,329,394 A | * | 2/1920 | Fry | A47L 13/512 248/539 |
| 1,398,127 A | * | 11/1921 | Collins | A47L 13/512 248/113 |
| 1,721,449 A | * | 7/1929 | Helmeke | A62C 31/28 239/588 |
| 3,365,761 A | * | 1/1968 | Kalvig | B25H 3/04 248/314 |
| 4,712,755 A | * | 12/1987 | Robbins | E03F 1/008 248/80 |
| 5,311,753 A | * | 5/1994 | Kanao | D06F 39/08 138/119 |
| 6,264,147 B1 | * | 7/2001 | Mitchell | A47L 13/512 248/113 |
| 2012/0153109 A1 | * | 6/2012 | Milbrandt | B65D 73/0064 248/224.8 |

* cited by examiner

Primary Examiner — Muhammad Ijaz
(74) Attorney, Agent, or Firm — Baumgartner Patent Law; Marc Baumgartner

(57) ABSTRACT

An RV sewage drain hose hanger that may be mounted to an RV or at a suitable location at an RV sewage dump station is disclosed. The apparatus includes an attachment point for the inboard end of the RV drain hose. When the drain hose is connected to the attachment point the hose is retained in a substantially vertical orientation with the open end of the drain hose facing upwardly. Located above the drain hose attachment is a hose support connection that supports a standard garden hose above the sewage drain hose so that the nozzle of the hose is directed downwardly into the open end of the drain hose. The hose support may be defined by a first and optional second platform, each having an opening for the hose. The flow of water from the hose nozzle is aimed directly into the open end of the sewage drain hose.

17 Claims, 10 Drawing Sheets

SEWAGE HOSE RINSING APPARATUS

TECHNICAL FIELD

The present invention relates to apparatus for hanging a sewage drain hose for simplifying the process of cleaning the hose. The invention is especially applicable for use with recreational vehicle sewage drain hoses.

BACKGROUND

Many recreational vehicles ("RVs") carry onboard sewage holding tanks. When the holding tank is full the onboard tank must be emptied into a sewage drain tank, typically at an RV dump station. The process of emptying the onboard holding tank is well known to thousands of RV enthusiasts; it can generally be described as follows:
 A. the inboard end of a sewage drain hose (which is typically carried on the RV) is attached to a drain fitting on the RV;
 B. the outboard end of the drain hose is attached to the inlet port of a sewage drain tank;
 C. the contents of the onboard holding tank are emptied into the sewage drain tank (by gravity flow or by pumping the contents) until the onboard holding tank is empty;
 D. the inboard end of the drain hose is disconnected from the drain fitting on the RV and is rinsed with a hose that is connected to a fresh water supply;
 E. once rinsed, the outboard end of the drain hose is disconnected from the inlet port and the drain hose is stowed in the RV.

The process described above is well known to any RV owner whose vehicle includes an onboard holding tank. A problem is also well known: rinsing the drain hose after the onboard tank has been emptied can be an awkward and messy job. After the inboard end of the drain hose has been disconnected from the drain fitting on the RV, the person draining the tank typically holds the hose in one hand while holding a garden hose in the other hand and aiming the flow of water from the hose into the now-open end of the drain hose. This takes two hands, one to hold the sewage drain hose so that it is generally vertical, and one to hold the rinse hose. This can be quite awkward. In addition, if water is not already flowing through the rinse hose, the person must find the valve and turn the water on. If the valve is not within the person's arm reach, they need to put the end of the sewage hose down while the operate the water valve. Then, when all systems are operable, aiming the flow of water into the sewage hose can be a hit-and-miss operation. This can lead to splashing, which can be unpleasant and unsanitary.

Because draining RV onboard holding tanks is a routine that takes place for nearly every RV, and given the known problems with existing drain systems, there is a need for a RV sewage drain system that simplifies the process, eliminates messy and unsanitary conditions, and which overcomes the problems with existing systems.

The present invention comprises an RV drain hose hanger that may be mounted to an RV or at a suitable location at an RV sewage dump station. The apparatus includes an attachment point for the inboard end of the RV drain hose. When the drain hose is connected to the attachment point the hose is retained in a substantially vertical orientation with the open end of the drain hose facing upwardly. Located above the drain hose attachment is a hose support connection that supports a standard garden hose above the sewage drain hose so that the nozzle of the hose is directed downwardly into the open end of the drain hose. In an embodiment, the hose support is defined by at least one garden hose support platform having an opening for the hose, and in another embodiment the hose support is defined by first and second garden hose support platforms, each having an opening for the hose. The garden hose support platforms include an opening through which the hose is inserted and generally orients and supports the hose. The garden hose support platforms may optionally include an opening with a gripping member that securely grips the hose end or a nozzle attached to the hose so that the flow from the nozzle is aimed directly into the open end of the sewage drain hose.

With the garden hose retained in the apparatus according to the invention, the water flow through the hose may be initiated. Water is directed into the sewage drain hose and the drain hose is rinsed in a hands-free operation. The operator is not required to manipulate multiple components at the same time and there are no splashes or unsanitary conditions.

BRIEF DESCRIPTION OF THE DRAWINGS

The invention will be better understood and its numerous objects and advantages will be apparent by reference to the following detailed description of the invention when taken in conjunction with the following drawings, in which.

Figure 10:
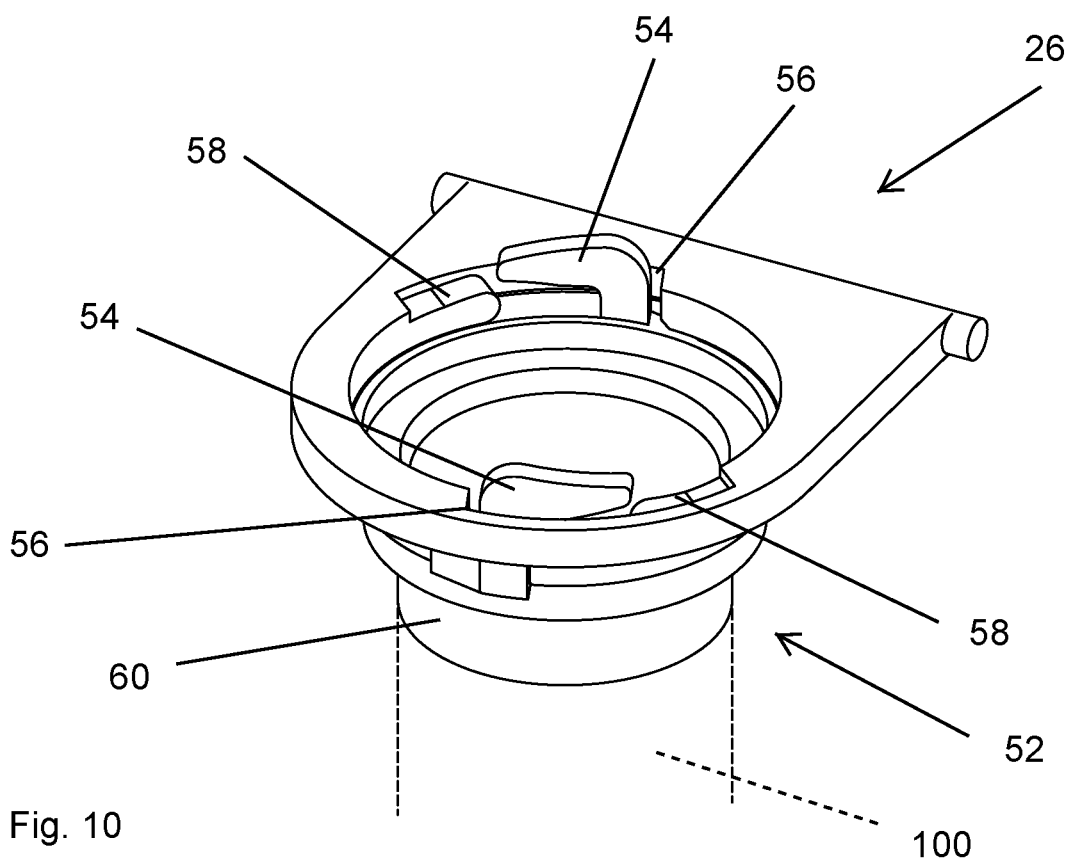
FIG. 10 is a top perspective view of the upper side of a sewage hose support plate, shown in isolation, and including the inboard end of a sewage hose inserted into the opening in the support plate but not secured therein.
Figure 12:
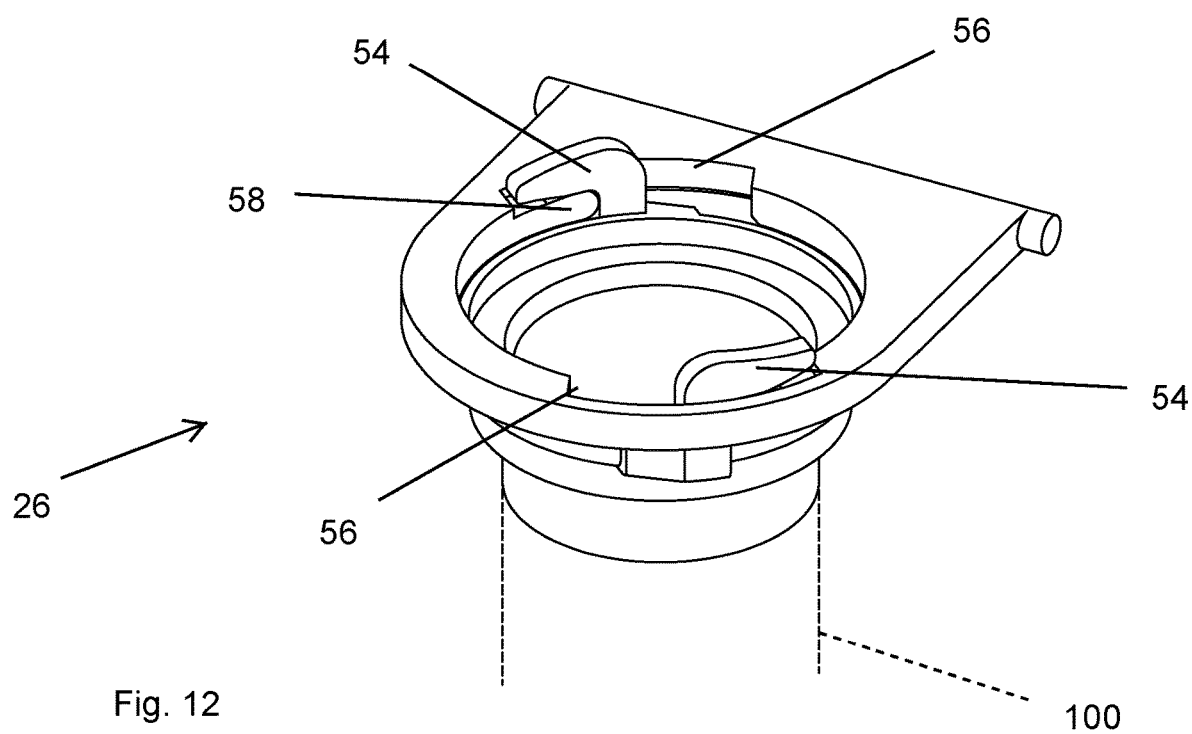
Figure 13:
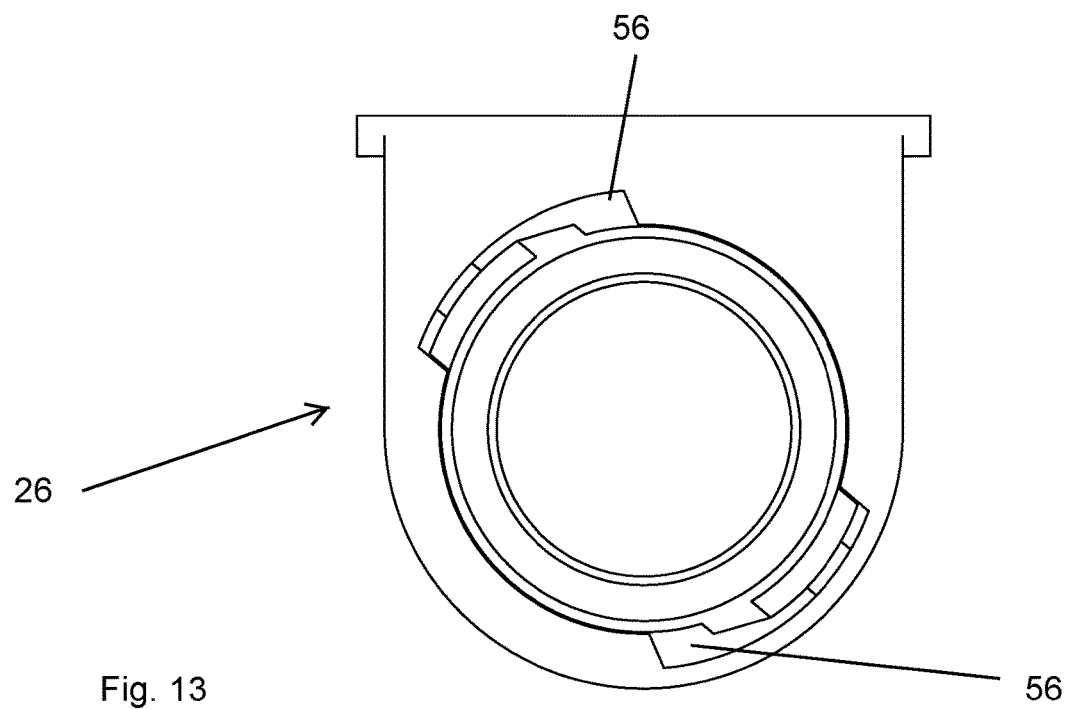
Figure 14:
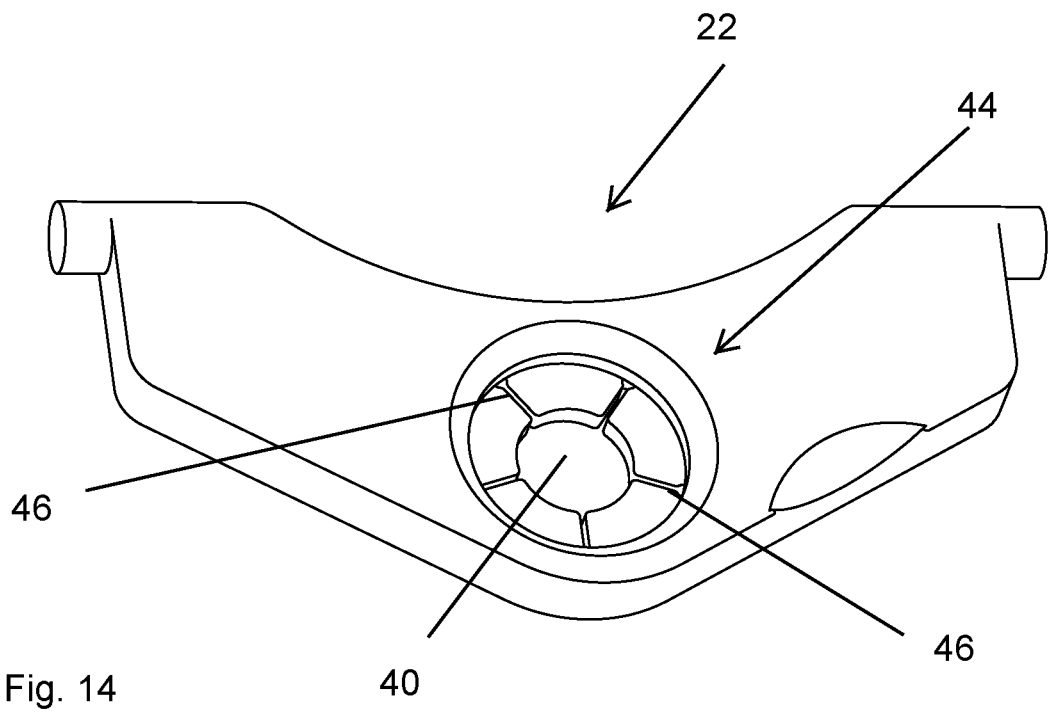
Figure 15:
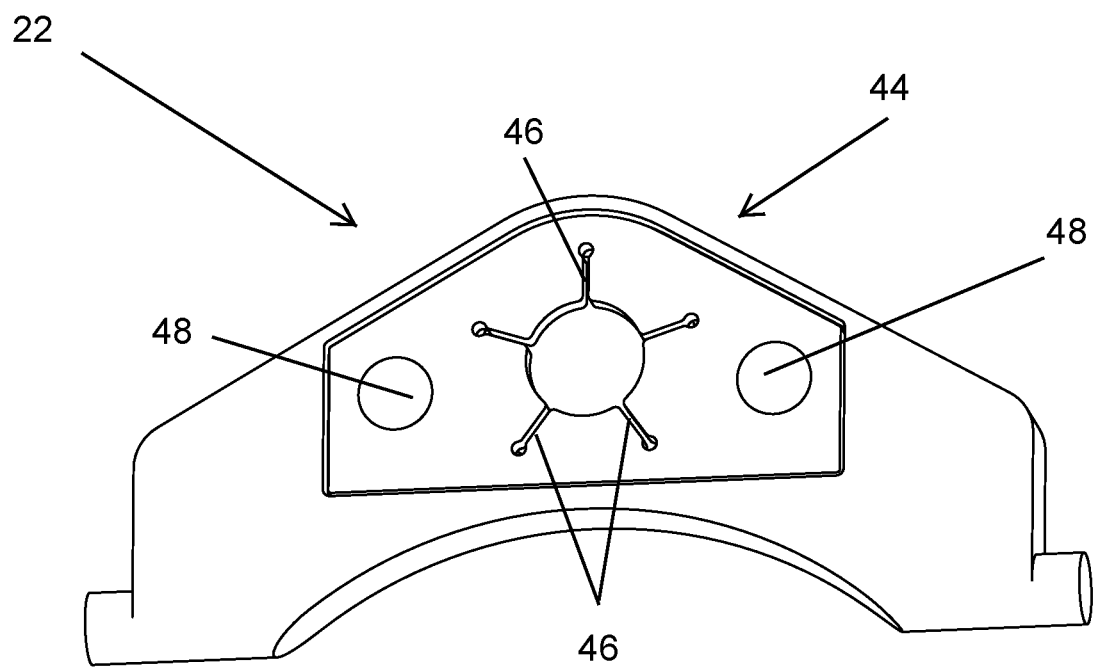

12 is a top perspective view of the upper side of a sewage hose support plate similar to that shown in FIG. 10, but in which the inboard end of the sewage hose has been secured to the support plate;

FIG. 13 is a top plan view of the sewage hose hanger illustrated in FIG. 12;

FIG. 14 is a top perspective view of an alternative embodiment of the upper side of a water hose support plate according to the invention, shown in isolation, and including a hose gripping element;

FIG. 15 is a bottom perspective view of the lower side of the alternative embodiment of the water hose support plate shown in FIG. 14.

DETAILED DESCRIPTION OF ILLUSTRATED EMBODIMENTS

The invention will now be described in detail with reference to the drawings. It will be understood that relative directional terms are used at times to describe components of the invention and relative positions of the parts. As a naming convention, the ground plane is considered to be a horizontal surface and relative directional terms correspond to this convention. With this convention, "upper" refers to the direction above and away from the ground plane; "lower" is generally in the opposite direction, "inward" is the direction from the exterior toward the interior of a component of the invention, "vertical" is the direction normal to the horizontal ground plane, and so on. The "inboard end" of a sewage drain hose refers to the end of the hose that is attached to the sewage drain port of an RV; the outboard end is the opposite end of the hose—that is, the end of the sewage drain hose that is inserted into the sewage dump tank opening port, which is typically at ground level since most sewage dump tanks are in-ground tanks.

Figure 1:
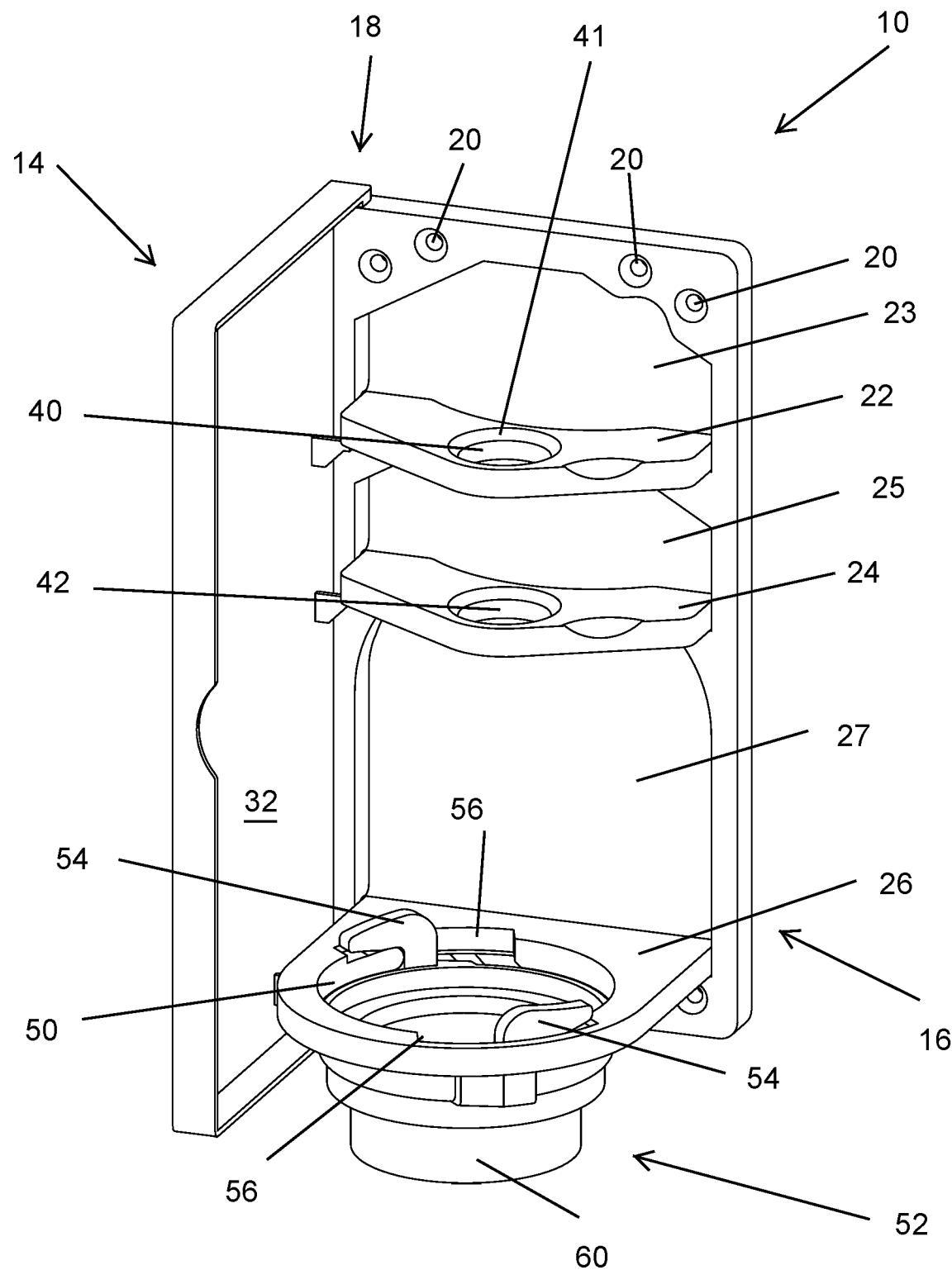
FIG. 1 is a perspective view of a hose hanger apparatus according to a first illustrated embodiment of the present invention, showing the apparatus with its cover in an open position and with the three hinged support plates or platforms, namely, the first and second water hose support plates and the sewage drain hose support plate, shown in their respective open, or support positions, and including an inboard end of a sewage drain hose attached to the sewage drain hose support plate.
Figure 4:
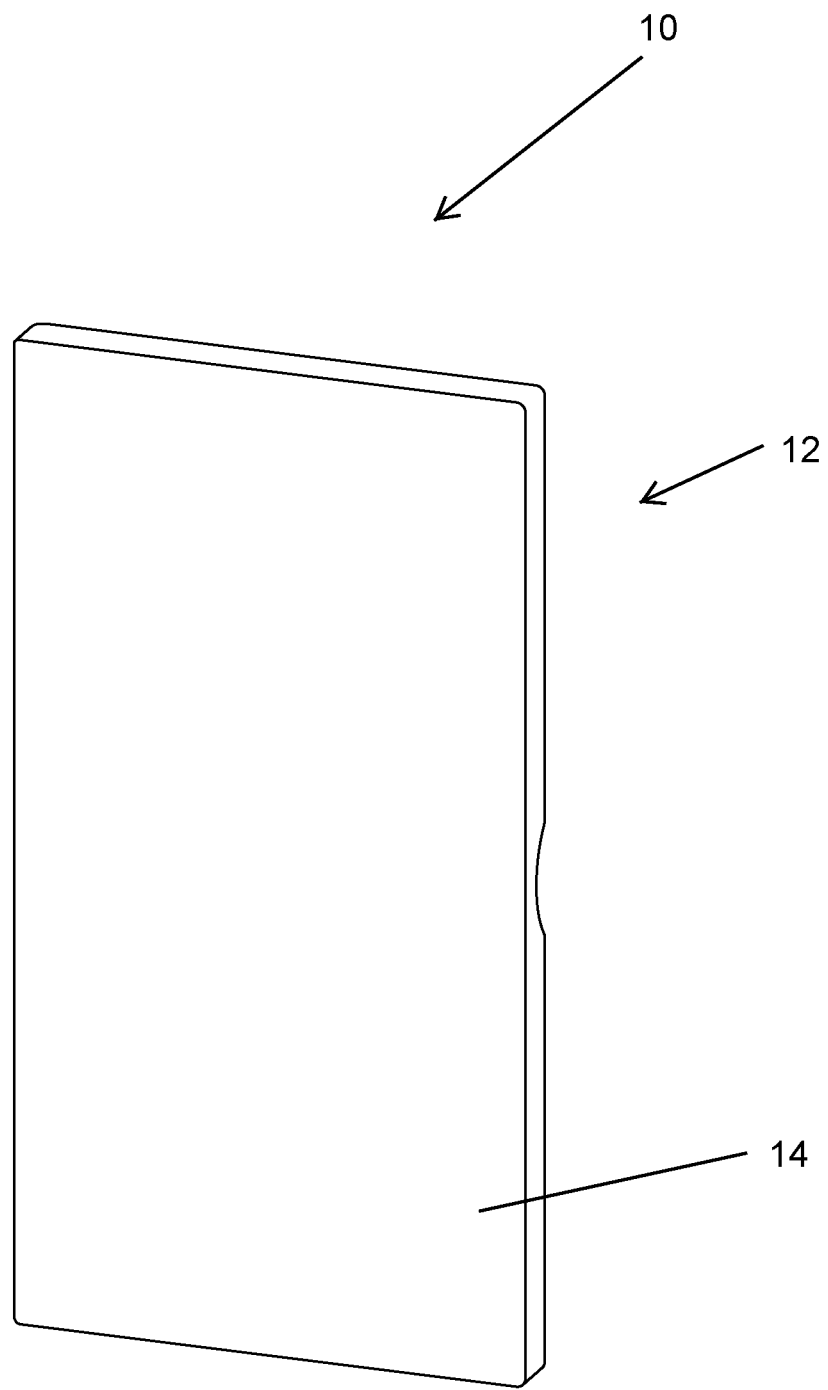
FIG. 4 is a perspective view of the hose hanger apparatus according to the invention, shown in FIG. 3, shown with its cover in the closed position.

With reference now to FIG. 1, the sewage hose hanger 10 according to the invention is illustrated as having an enclosure 12 defined by a cover plate 14 that is connected to a back plate 16 (also referred to as backing plate 16) with a hinge 18. The hose hanger 10 may be adapted so that the hinge 18 is on either side of the backing plate 16. In FIG. 1 the cover plate 14 is in its open position. As detailed below, the hose hanger 10 may be mounted to an exterior wall of an RV, or may be mounted to any appropriate structure such as a post adjacent to a sewage dump tank inlet port at an RV sewage dump station. Turning briefly to FIG. 4, the sewage hose hanger 10 is shown in with the cover plate 14 in the closed position, and in this position the hanger 10 is quite compact. As such, the compact closed position shown in FIG. 1 is very aerodynamic and does not cause wind drag when the RV is being moved. It will be appreciated that when the hose hanger 10 is mounted to an exterior wall of an RV, it is important to have the hinge 18 located toward the front of the RV so that the cover plate 14 doesn't get blown open as the RV moves down the road from wind action. Thus, if the hose hanger is mounted on the left side of the RV (i.e., the driver side) the hinge 18 will be in the position shown in FIG. 1. If the hose hanger is to be mounted on the right side of the RV (i.e., the passenger side) the hinge 18 will be mounted opposite from that shown in FIG. 1.

Figure 2:
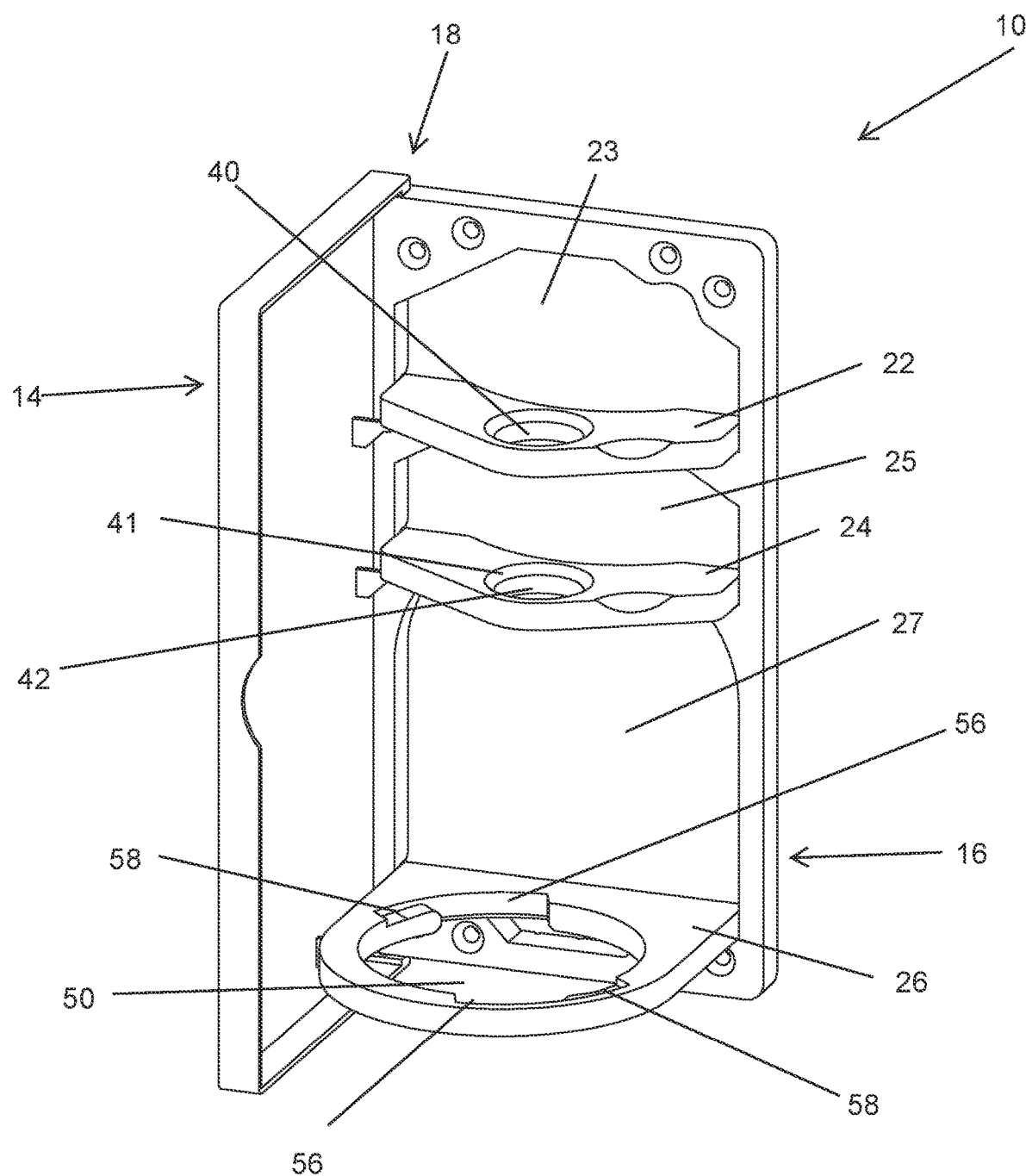
FIG. 2 is a perspective view of the invention illustrate in FIG. 1 but with the inboard end of the sewage drain hose removed from the sewage hose support plate.
Figure 3:
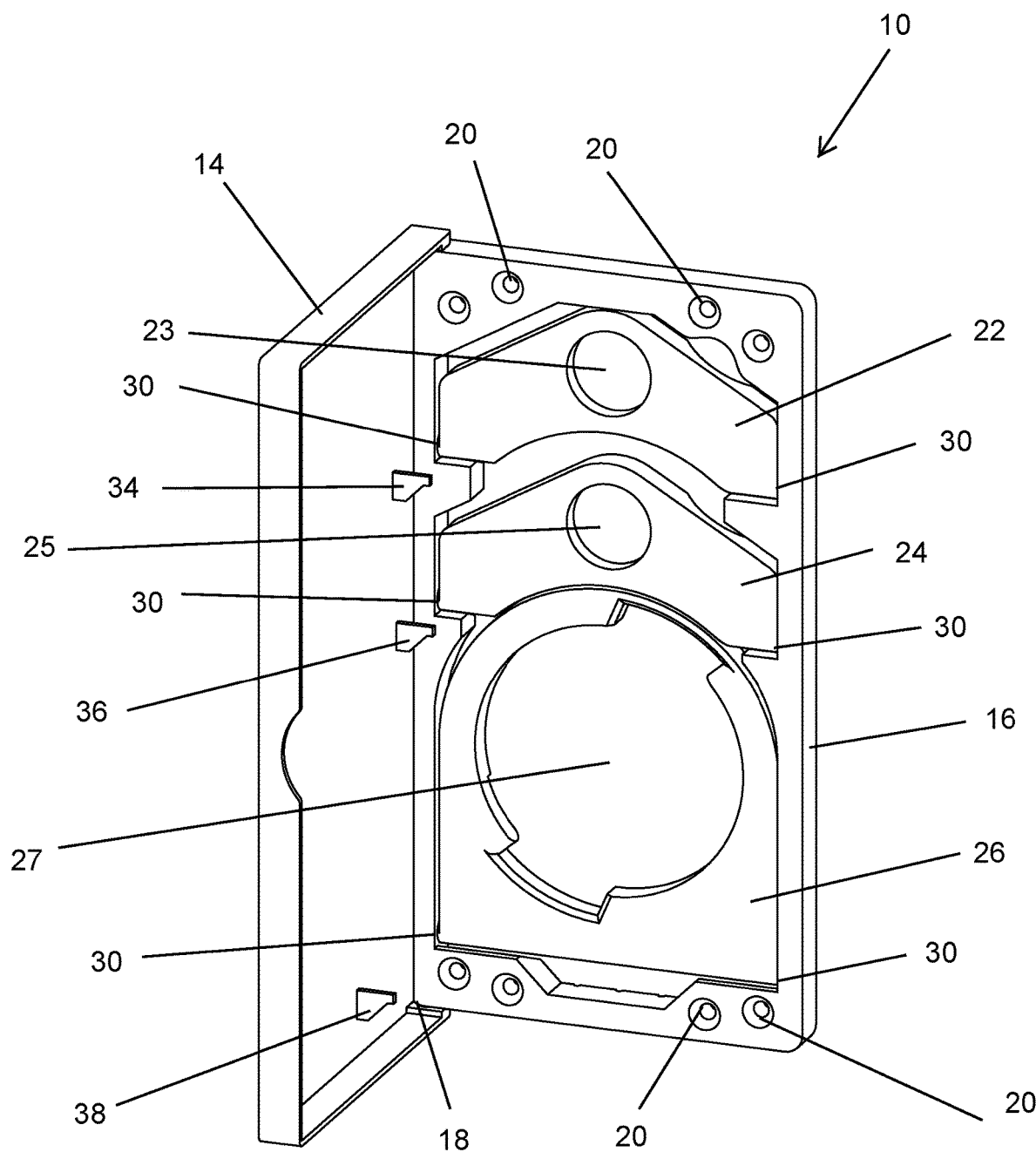
FIG. 3 is a perspective view of the invention illustrate in FIG. 2 and showing the three hinged support plates in their closed, or stowed positions.

The cover plate 14 is shown in the open position in FIGS. 1, 2 and 3. Appropriate latches (not shown) may be utilized to secure the cover plate in the closed position of FIG. 4, and to allow the operator to open the cover plate 14 as shown in FIG. 1, for instance. Backing plate 16 includes plural mounting holes 20 through which fasteners such as screws may be inserted to mount the apparatus 10 to an RV or to a post or some other surface at an RV dump station.

Figure 5:
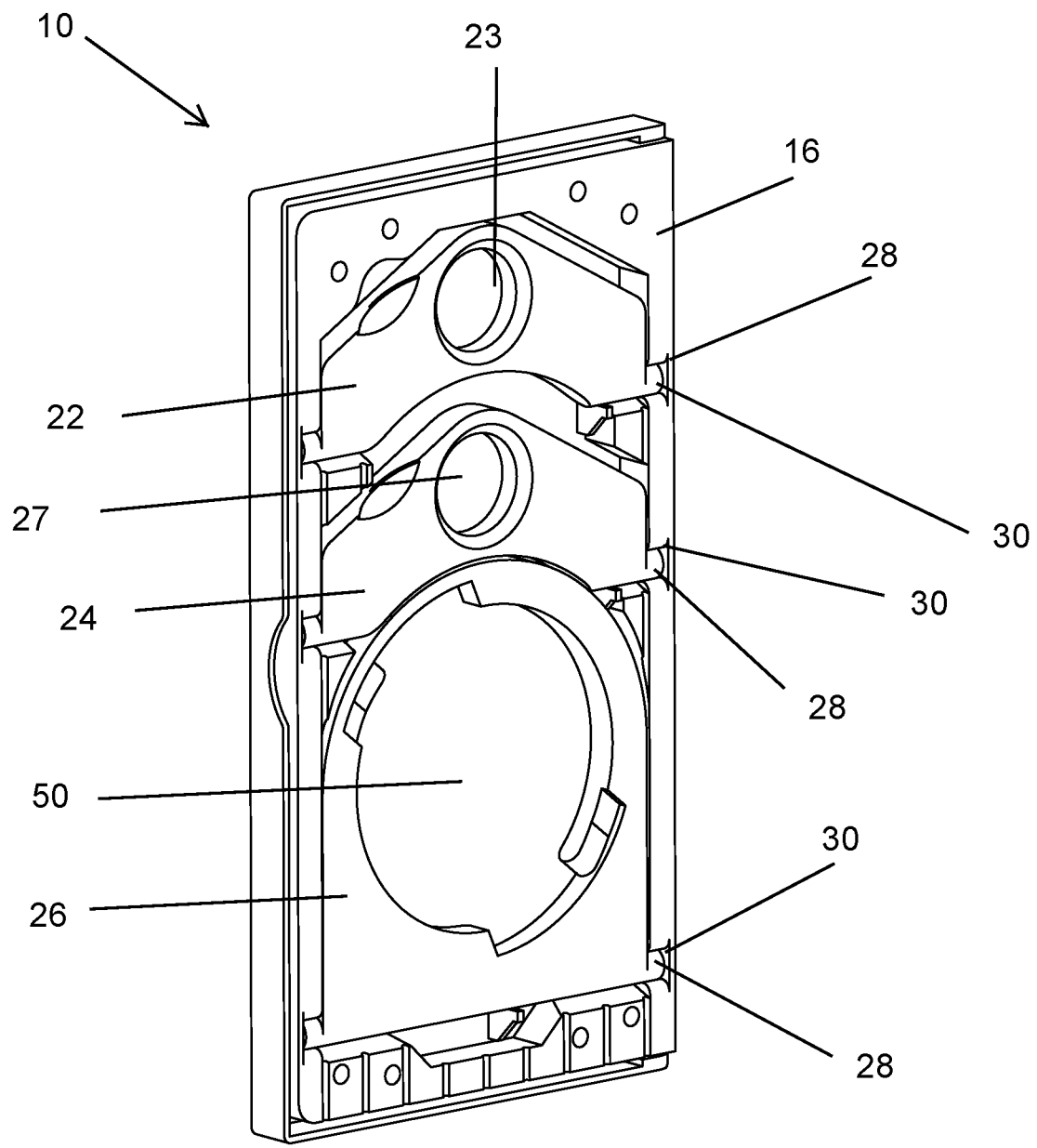
FIG. 5 is a perspective view back side of the hose hanger apparatus shown in FIG. 4.
Figure 6:
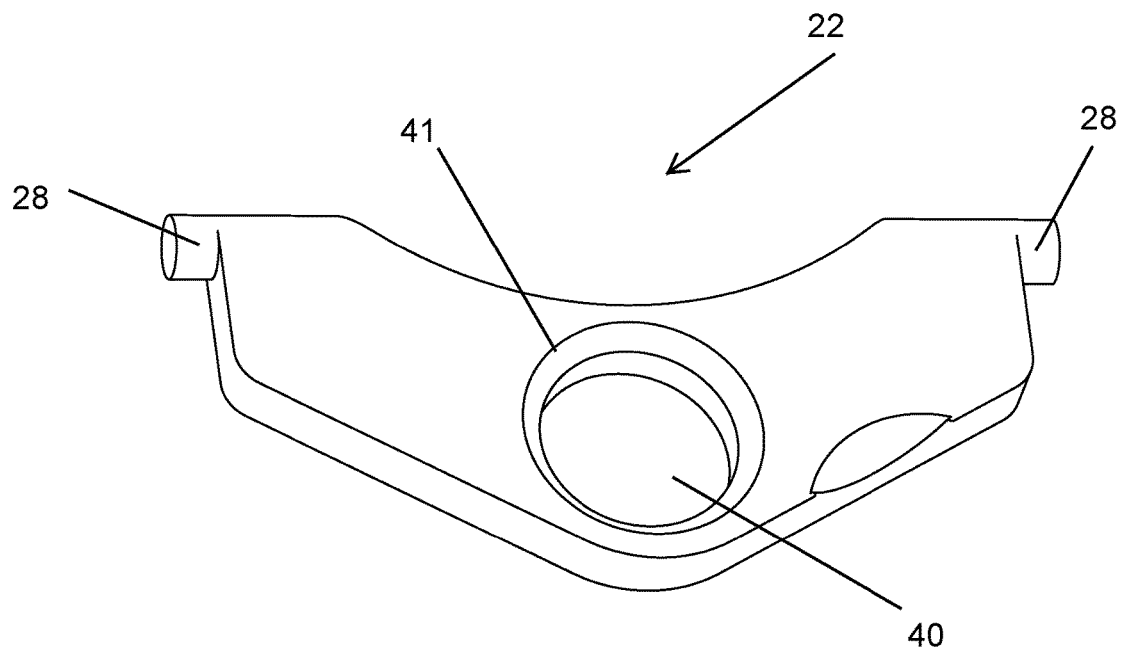
FIG. 6 is a top perspective view of the upper side of a water hose support plate according to the invention, shown in isolation.
Figure 7:
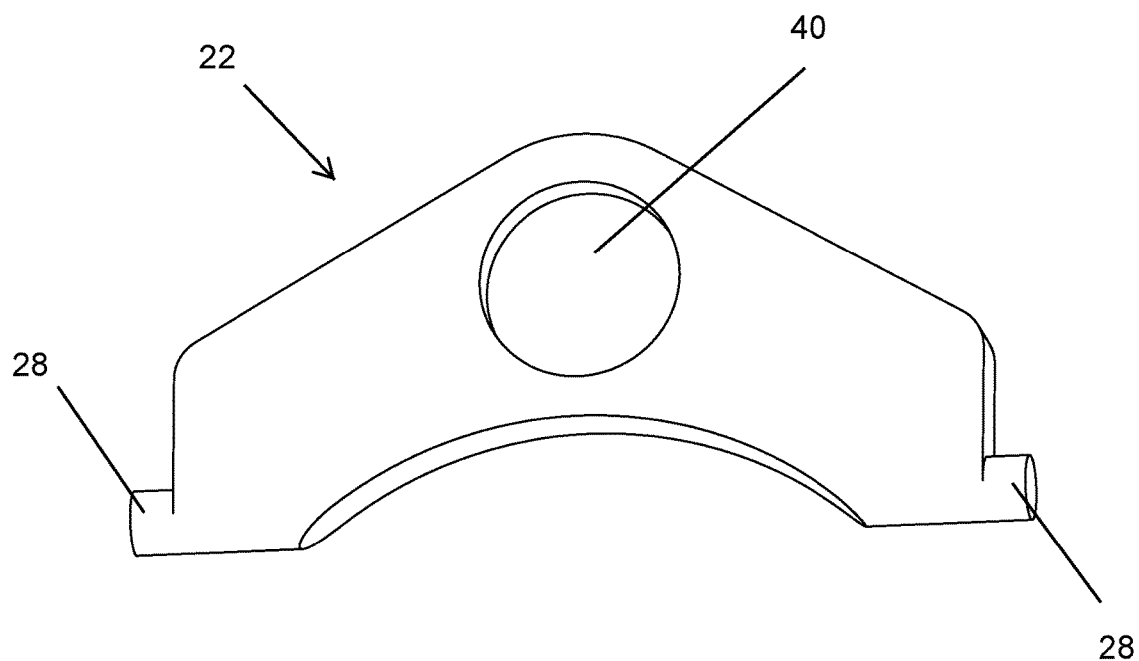
FIG. 7 is a bottom perspective view of the lower side of the water hose support plate shown in FIG. 6.

In the embodiment of FIGS. 1 through 3, and 5, there are three support plates, each of which is pivotally attached to the back plate 16. The uppermost support plate is identified with reference number 22 and is the upper garden hose support plate (also referred to as a rinse hose support plate). The intermediate support plate is identified with reference number 24 and is the also a rinse hose support plate. The lowermost support plate is identified with reference number 26 and is the sewage drain hose attachment plate; it defines the attachment point for the inboard end of the RV's sewage drain hose 100, as detailed below. In FIGS. 3 and 5 the three support plates 22, 24 and 26 are shown folded upwardly into their stowed positions. In this position the support plates are nested into cooperatively shaped openings (reference numbers 23, 25 and 27 in FIGS. 2 and 3) in the base plate 16 so that the cover plate 14 may be in its closed position as shown in FIG. 4. As noted, each of the support plates is pivotally attached to the back plate. The pivotal attachment of the support plates is shown in FIGS. 6 through 9 and is accomplished with bosses 28 that extend from the outer edges of the support plates and which are received in openings 30 in the back plate 14 to allow the support plates to pivot relative to the back plate. Of course, other types of hinge structures may be used to allow the support plates to pivot relative to the back plate. In FIGS. 1 and 2, the three support plates 22, 24 and 26 have been pivoted about 90 degrees from the stowed positions of FIGS. 3 and 5 into their operational positions. The interior surface 32 of cover plate 14 includes three supports 34, 36 and 38. The supports 34, 36 and 38 define braces that support the three support plates 22, 24 and 26, respectively, when the support plates are in their operational positions of FIGS. 1 and 2. Thus, as seen in FIG. 1, when the support plates are pivoted into their operational positions the plates are supported in those positions by the supports. More specifically, support 34 supports is the upper rinse hose support plate 22. The support 36 supports the intermediate rinse hose support plate 24. And the support 38 supports the sewage drain hose attachment plate 26. It will be appreciated that the function of the stops 34, 36 and 38 may be accomplished with equivalent bracing structures, including for example support legs on the lower sides of the support plates that engage the backing plate 26 when the support plates are in their operational positions.

It will be noted that in the drawings the hose hanger 10 includes two rinse hose support plates 22 and 24. However, the invention is equally functional with only a single rinse hose support plate 22. In other words, the intermediate rinse hose support plate 24 should be considered as an optional component. Furthermore, more than two rinse hose support plates may be used in situations where additional rinse hose support is deemed to be desirable. Moreover, it will be understood that the back plate 16 serves as a mount and support for the hose supports and the sewage drain hose attachment plate 26. The back plate 16 shown in the drawings is illustrated as a separate unit to which the supports are attached. However, the supports 22 and 24, and the attachment plate 26, may be mounted directly to a support surface such as a post located at an RV dump station, or directly to the RV. As such, the back plate, while being a component of an integrated unit as shown in the drawings, must be considered optional.

A standard garden hose typically functions as the source of water to flush and rinse the RV sewage drain hose. The upper rinse hose support plate 22 has an opening 40 that is oversized relative to the diameter of a standard garden hose and is configured to allow a standard garden hose to be inserted through the opening with some tolerance between the hose and the opening. Opening 40 preferably has a beveled upper edge 41 as shown. As detailed below, this allows the hose to be inserted but relatively loosely retained and supported in the support plate 22. The oversized opening 40 also accommodates garden hoses of various diameters and nozzles that may be attached to the hose. The intermediate rinse hose support plate 24 also has an opening 42, preferably beveled, that is vertically aligned and preferably coaxial with opening 40 in support plate 22 when the plates 22 and 24 are in their operational positions as in FIG. 1. The diameter of the opening 42 at the center of the gripping insert 44 is preferably less than the diameter of a standard garden hose.

Figure 8:
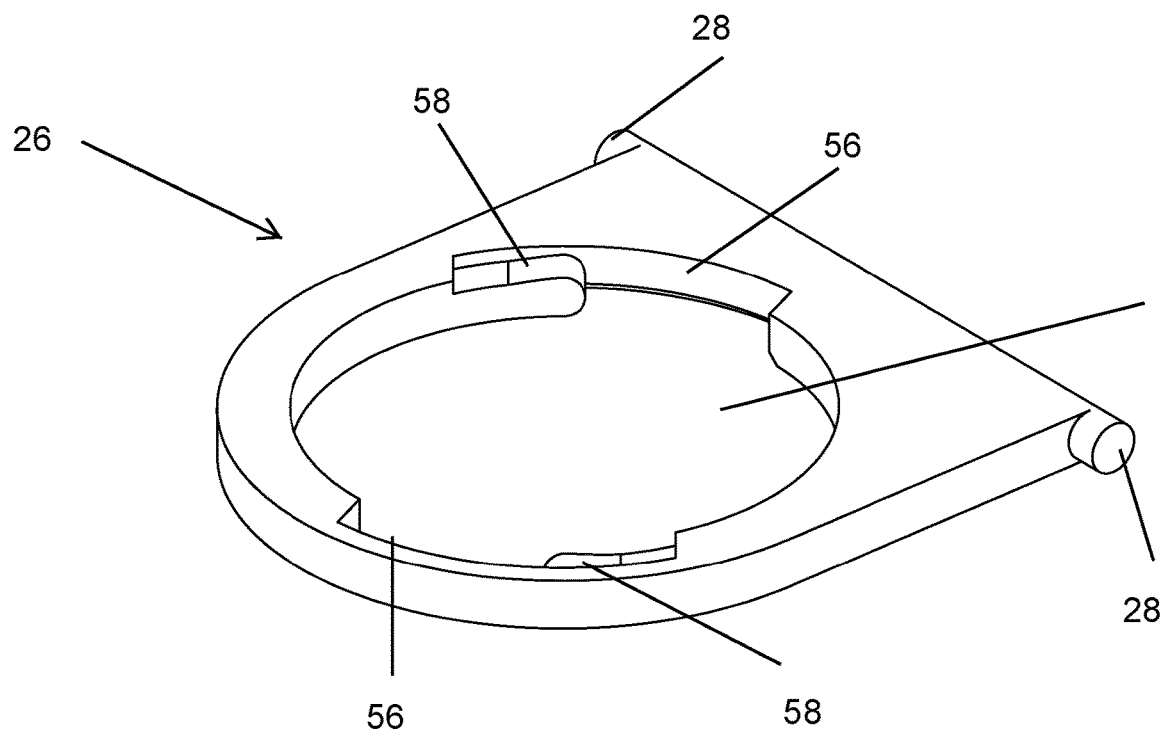
FIG. 8 is a top a top perspective view of the upper side of a sewage hose support plate according to the invention, shown in isolation.
Figure 9:
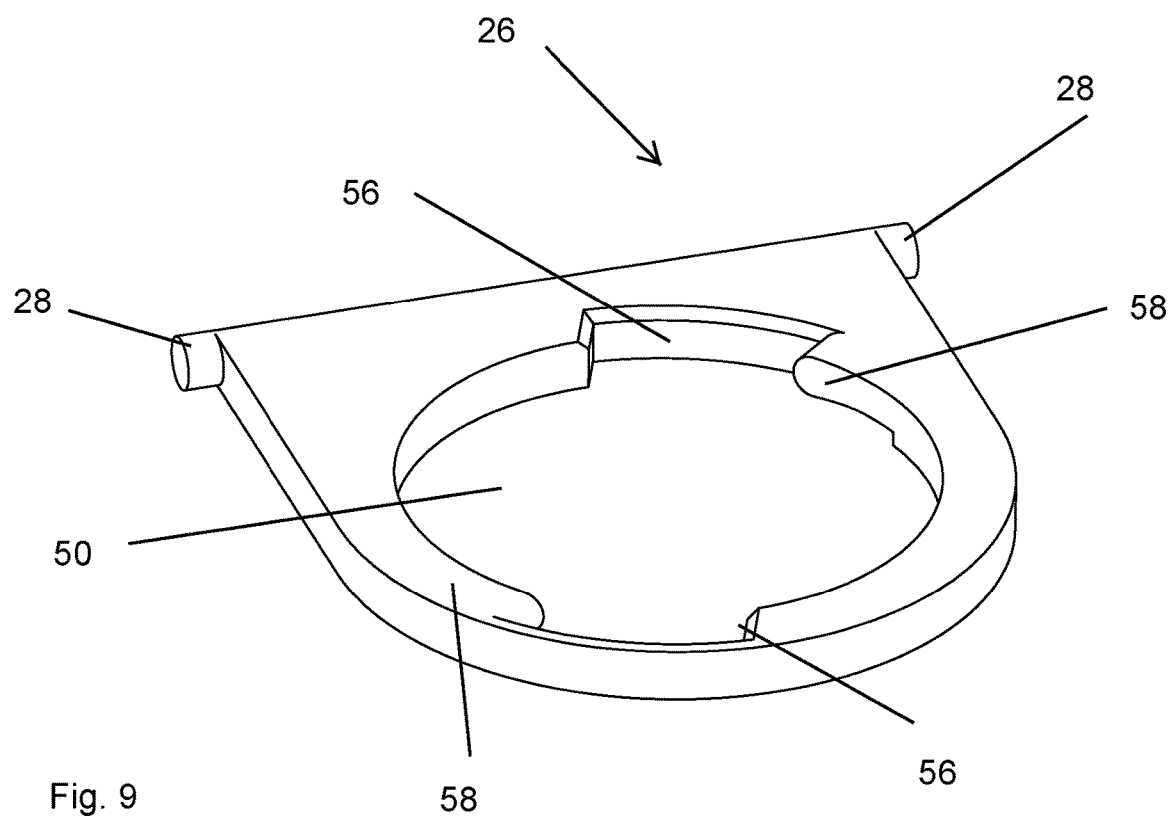
FIG. 9 is a bottom perspective view of the lower side of the sewage hose support plate shown FIG. 8.
Figure 11:
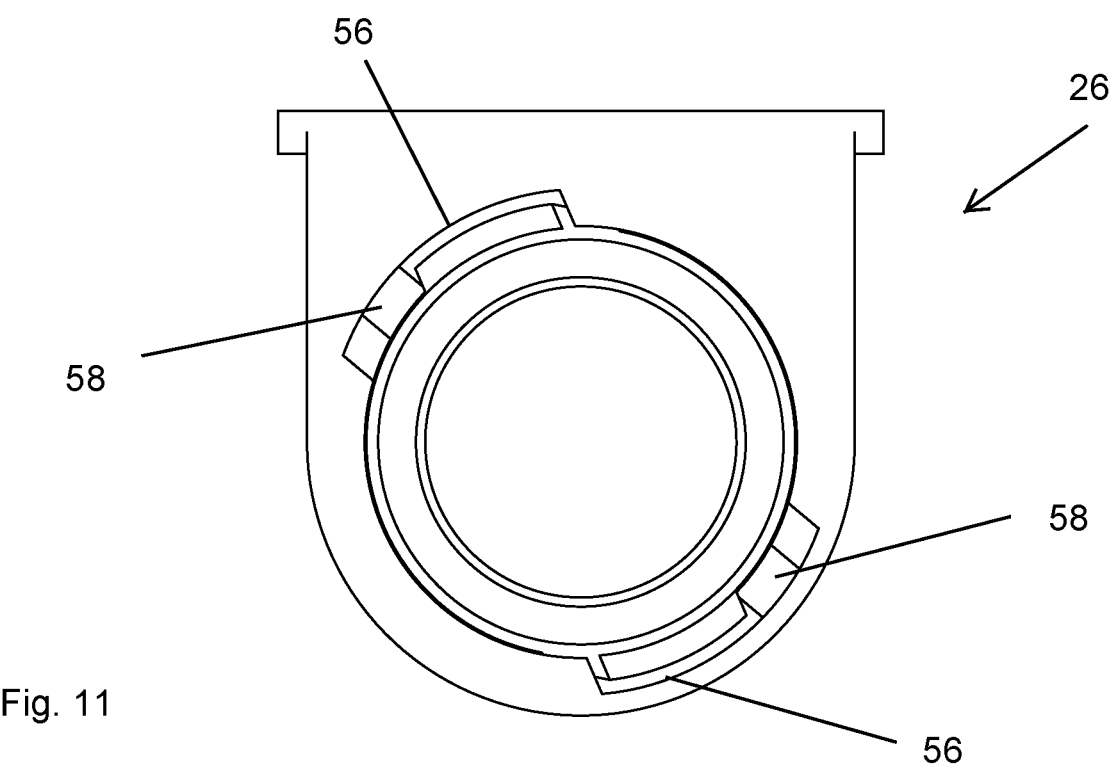
FIG. 11 is a top plan view of the sewage hose hanger illustrated in FIG. 10.

The sewage drain hose attachment plate 26 is shown in the FIGS. 1, 2, 3 and 5, and is shown in isolation in FIGS. 8 and 9. This attachment plate facilitates connection of a standard RV sewage drain hose 100 to the apparatus 10 (shown in phantom lines in FIG. 12, for example. More specifically, all RV sewage drain hoses include a latching mechanism that allows the connector fitting (reference number 52 in FIG. 1) to be secured to the RV's sewage drain port (not shown). The connector fitting 52 is typically a bayonet-type fitting. In the illustrated embodiment, the latching mechanism is defined by opposed and oppositely oriented hooks 54 that extend from and are part of the fitting 52. The sewage drain hose attachment plate 26 has an opening 50. The interior circumference of opening 50 includes opposed extensions 56, which have a greater diameter than the balance of opening 50, and opposed hook-receiving ramps 58 adjacent to the respective extensions that define engagement locations for the hooks 54. With reference to FIGS. 10 and 11, which shows the fitting 52 inserted into the opening 50 in support plate 26, the hooks 54 are inserted into the opposed oversized extensions 56 but the hooks are not engaged with the ramps 58. To secure the fitting 52 (and the attached sewage drain hose 100, shown in phantom lines in FIG. 1) to the support plate 26, the sewage drain hose 100 and the attached fitting 52 is rotated (counterclockwise in the view of FIGS. 10 and 11) so that the hooks 54 engage the respective and opposed ramps 58 as shown in FIGS. 12 and 13. This engagement between the hooks 54 and ramps 58 secures the sewage drain hose fitting 52 to the sewage drain hose attachment plate 26. Rubber fittings or surfaces may be included on ramps 58 to provide a more secure attachment between the fitting 52 and the plate 26. The sewage drain hose 100 is illustrated schematically in phantom lines in FIG. 1 and will be understood to be attached to the lower flange 60 of the fitting 52 in a conventional manner. When the fitting 52 is attached to the attachment plate 26 as shown in FIGS. 12 and 13, the opening 50 in the plate 26 underlies and is vertically aligned with the openings 40 and 42 in the upper and intermediate plates 22 and 24, respectively, and the sewage drain hose 100 will be substantially vertically oriented and depend downwardly from the attachment plate 26.

Operation of the apparatus 10 will now be described. As noted above, the apparatus 10 may be mounted to the exterior of an RV adjacent the location of the holding tank outlet port, or to a post or other surface at the RV dump station. Use of the apparatus 10 on the RV has the advantage of the RV operator always being able to use the apparatus even at RV dump stations that do not have the device. And RV dump stations benefit by mounting the device at the RV dump so that all RV owners may use the apparatus, with its associated ease of operation and sanitation benefits.

First, the apparatus 10 is prepared to accept the RV drain hose and the garden hose. Thus, the cover plate 14 is swung from its closed position of FIG. 4 into its open position as shown in, for instance, FIG. 1. Next, the three support plates 22, 24 and 26 are moved from their stowed positions shown in FIG. 3, into their operational positions as seen in FIGS. 1 and 2. The fitting 52 at the inboard end of the RV's sewage drain hose 100 is to the RV's sewage tank, the outboard end of the drain hose 100 is inserted into the dump tank opening port, and draining of the onboard tank is commenced. When the holding tank has been drained, the fitting 52 on the inboard end of the RV sewage drain hose 100 is disconnected from the onboard holding tank outlet fitting on the RV, and the fitting 52 is connected to the sewage hose attachment plate 26 as detailed above and as shown in FIGS. 1 and 12 and 13. The nozzle end of a garden hose, or rinse hose, (not shown) is then inserted through opening 40 of support plate 22 and into the opening 42 of support plate 24 (if two support plates are used; if one support plate is used the hose is inserted only through the opening of that one plate). In this position, the rinse hose is held securely by the two support plates 22 and 24 and the nozzle of the hose is directed vertically downwardly, directly into the underlying and aligned sewage drain hose 100. As such, the flow of water from the rinse hose is directed downwardly into the underlying opening of the sewage drain hose 100 as it is retained in the attachment plate 26. A flow of water is then initiated through the rinse hose and the water flows into the sewage drain hose, rinsing and cleaning the drain hose with the discharge water flowing into the dump station tank. Because the rinse hose is held relatively loosely in openings 40 and 42 of support plate 22, the garden hose may be wiggled and manipulated to direct the flow of water over the entire interior of the underlying sewage drain hose to insure a thorough rinse.

When the sewage drain hose has been sufficiently rinsed, the flow of water through the rinse hose is stopped and the hose may be removed from apparatus 10 and stowed as appropriate. Fitting 52 (and the attached sewage drain hose 100) may be disconnected from support plate 26 by rotating the fitting 52 counterclockwise (in the view of FIGS. 10 through 13) to thereby disengage the hooks 54 from the ramps 58. The outboard end of the sewage drain hose may then be disconnected from the dump station port and the rinsed sewage drain hose may be coiled and stowed in the RV.

If the apparatus 10 is of the type that is attached to the RV itself, as opposed to being mounted at the RV dump station, the three support plates 22, 24 and 26 are moved into their stowed positions (FIG. 2) and the cover plate 14 is closed and latched (FIG. 4). Furthermore, if the sewage hose attachment plate 26 and the at least one flush hose support plate are mounted to a support post at an RV dump station, the process of opening the cover and pivoting the support plates to their operational positions are not pertinent since the plates 26, 24, etc. are always in their operational positions.

An alternative embodiment of an upper support plate 22 is illustrated in FIGS. 14 and 15. In FIG. 14 the alternative embodiment is shown in an upper perspective view, and in FIG. 15 it is shown in a lower perspective view. In this alternative embodiment, the rinse hose opening 40 includes a flexible gripping member or insert 44 that has a central opening 45. The gripping insert 44 is preferably a rubber or elastic material that is adapted to grip a garden hose end or a nozzle and hold it securely. For instance, the gripping insert 44 may be a rubber sheet that has plural radially extending slits 46 that allow the hose to be inserted into the opening 40 and facilitate a secure grip on the hose, but which allow the hose to be easily removed from the opening. The gripping insert 44 may be attached to the support plate 22 in opening 40 in many ways, for example, with a conventional heat-stake connection 48 as shown in FIG. 5 or with adhesives. It will be understood that the intermediate support plate 24 may also include the optional gripping member as just described.

It will be apparent to those of skill in the art that a user may want to simply connect the fitting 52 to the support plate 26 and to hold the flush hose by hand. Because the support plate 26 securely retains the sewage drain hose with the parts of the hose adjacent the fitting in a substantially vertical orientation, the user is free to direct flushing water into the drain hose as desired. This one-hand operation is vastly simpler and more effective than currently used methods where the uses holds the bitter end of the sewage drain hose with one hand and tries to spray water into the hose with the other hand.

Those of skill in the art will appreciate that certain equivalent modifications may be made to the invention without departing from its scope. For example, a single garden hose support plate may be used to retain and support the garden hose. And the garden hose support plate may be defined by a cylindrical tube that supports the garden hose. Moreover, especially in the instance where the apparatus 10 is mounted at the RV dump station, the support plates (regardless of how they are configured) may be permanently fixed in their operational positions (e.g., FIG. 1) and the cover plate may be omitted because aerodynamics are not of concern when the apparatus is not mounted to an RV. In another alternative embodiment, the upper and intermediate support plates may be replaced with a single hose-holding structure such as a cradle that grips the hose and directs the flow of water into the underlying sewage drain hose. As noted previously, the apparatus may be operated with a single flush hose support structure if desired.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. A sewage hose flushing apparatus, comprising:
a sewage hose connector defined by a support having an opening therethrough mounted to a back surface such that the support is about perpendicular to the back surface in an operational position; and
a first flush hose support having an opening therethrough and mounted to the back surface such that the first flush hose support is about perpendicular to the back surface in an operational position, and wherein the opening of the first flush hose support is aligned above the opening of the sewage hose connector when both are in an operational position, and wherein the sewage hose connector support and the first flush hose support are both pivotally attached to the back surface and are movable between respective stowed and operational positions and further including a first brace for supporting the sewage hose connector in the operational position and a second brace for supporting the first flush hose support in the operational position of the first flush hose.

2. The sewage hose flushing apparatus according to claim 1 including a cover plate hingedly attached to the back surface, the cover plate movable to a closed position when the sewage hose connector and the first flush hose support are in the respective stowed positions.

3. The sewage hose flushing apparatus according to claim 2 in which the first and second braces are mounted to an inner surface of the cover plate.

4. A sewage hose flushing apparatus, comprising:
a sewage hose connector defined by a support having an opening therethrough mounted to a back surface such that the support is about perpendicular to the back surface in an operational position, and a first flush hose support having an opening therethrough and mounted to the back surface above the sewage hose connector,
wherein the sewage hose connector opening includes fittings configured for releasably securing two oppositely opposed hooks on a sewage hose fitting, such that the sewage hose fitting hooks can be secured to the sewage hose connector opening by rotating in a first direction and released by rotating in a second, opposite direction.

5. The sewage hose flushing apparatus according to claim 4 in which the first and second flush hose supports are each pivotally attached to the back surface and independently movable between a stowed position and an operational position.

6. The sewage hose flushing apparatus according to claim 5 in which the first and second flush hose supports are each pivotally attached to the back surface and independently movable between a stowed position and an operational position.

7. The sewage hose flushing apparatus according to claim 6 wherein the opening in the first flush hose support includes a hose gripping member.

8. The sewage hose flushing apparatus according to claim 7 in which the hose gripping member is defined by a rubber member having an opening that plural slits radiating from the opening.

9. The sewage hose flushing apparatus according to claim 6 wherein the sewage hose connector opening fittings are configured to bayonet mount with the hooks.

10. The sewage hose flushing apparatus according to claim 6 wherein the sewage hose connector opening fittings comprise two opposed extensions, having a greater diameter than a diameter of the sewage hose connector opening, and two opposed ramps that define engagement locations for the hooks and are positioned adjacent to each of the extensions.

11. The sewage hose flushing apparatus according to claim 6 in which the opening of the first flush hose support has a smaller diameter than the opening of the sewage hose connector.

12. The sewage hose flushing apparatus according to claim 6, wherein the first flush hose support is about perpendicular to the back surface in an operational position, and wherein the opening of the first flush hose support is aligned above the opening of the sewage hose connector when both are in an operational position, and wherein the sewage hose connector support and the first flush hose support are both pivotally attached to the back surface and are movable between respective stowed and operational positions.

13. The sewage hose flushing apparatus according to claim 12, further comprising a first brace for supporting the sewage hose connector in the operational position and a second brace for supporting the first flush hose support in the operational position.

14. The sewage hose flushing apparatus according to claim 6, further comprising a second flush hose support having an opening and mounted to the back surface above the first flush hose support, wherein the second flush hose support is about perpendicular to the back surface in an operational position so that the opening in the second flush hose support aligns with the opening in the first flush hose support in an operational position.

15. A method of flushing a recreational vehicle sewage drain hose having a connector fitting at an inboard end, the connector defining an opening into the sewage drain hose, comprising the steps of:
   a. providing a sewage hose flushing apparatus, comprising a sewage hose connector defined by a support having an opening therethrough mounted to a back surface such that the support is about perpendicular to the back surface in an operational position; and
   a first flush hose support having an opening therethrough and mounted to the back surface above the sewage hose connector such that the first flush hose support is about perpendicular to the back surface, and wherein the opening of the first flush hose support is aligned above the opening of the sewage hose connector, and wherein the sewage hose connector opening includes fittings configured for releasably securing two oppositely opposed hooks on a sewage hose fitting, such that the sewage hose fitting hooks can be secured to the sewage hose connector opening by rotating in a first direction and released by rotating in a second, opposite direction;
   b. connecting the connector fitting to the opening of the sewage hose connector support so that the sewage drain hose adjacent to the sewage hose connector is oriented substantially vertically and so that the inboard end of the sewage drain hose is upwardly open;
   c. positioning a flush hose having a nozzle into the opening of the first flush hose support so that the nozzle is directed downwardly into the upwardly open end of the sewage drain;
   d. initiating a flow of water through the flush hose and into the sewage drain hose to flush the sewage drain hose;
   e. stopping the flow of water;
   f. disconnecting the connector fitting from the sewage hose connector support; and
   g. removing the flush hose from the first flush hose support.

16. The method according to claim 15 wherein the flush hose is supported by extending the nozzle through the opening in the first flush hose support that is positioned above the sewage hose connector support so that the flow of water through the flush hose is directed into the upwardly open end of the sewage drawing hose and so that the flush hose is supported by the first flush hose support.

17. The method according to claim 16 including the step of extending the nozzle of the flush hose through an opening in a second flush hose support that is positioned above the first flush hose support and vertically aligned with the opening in the first flush hose support.

* * * * *